US008672006B2

(12) United States Patent
Moon

(10) Patent No.: US 8,672,006 B2
(45) Date of Patent: Mar. 18, 2014

(54) NON-PNEUMATIC TIRE

(75) Inventor: Michael Moon, Iowa City, IA (US)

(73) Assignee: New Tech Tire LLC, Boca Raton, FL (US)

( * ) Notice: Subject to any disclaimer, the term of this patent is extended or adjusted under 35 U.S.C. 154(b) by 181 days.

(21) Appl. No.: 13/183,804

(22) Filed: Jul. 15, 2011

(65) Prior Publication Data

US 2013/0014874 A1 Jan. 17, 2013

(51) Int. Cl.
*B60C 7/14* (2006.01)

(52) U.S. Cl.
USPC .......................................... 152/276; 152/246

(58) Field of Classification Search
USPC ......... 152/1, 5, 7, 11, 12, 246, 247, 253, 256, 152/258, 259, 260, 267, 269, 270, 273, 275, 152/276, 277
See application file for complete search history.

(56) References Cited

U.S. PATENT DOCUMENTS

| 1,083,798 | A | 1/1914 | Butts |
|---|---|---|---|
| 1,113,036 | A | 10/1914 | Mitchell |
| 1,160,508 | A | 11/1915 | Hay |
| 1,197,987 | A | 9/1916 | Winick |
| 1,229,861 | A | 6/1917 | Auberlin |
| 1,295,266 | A | 2/1919 | Bullard |
| 1,391,985 | A | 9/1921 | Siino |
| 1,412,882 | A | 4/1922 | Gerome |
| 1,471,580 | A | 10/1923 | Walton |
| 1,610,238 | A | 12/1926 | Benson |
| 1,625,679 | A | 4/1927 | Pearson |
| 1,639,940 | A | 8/1927 | Guvia |
| 1,687,206 | A | 10/1928 | Hatvani |
| 2,435,625 | A | 2/1948 | Garcia |
| 4,459,167 | A | 7/1984 | Markow et al. |
| 4,462,447 | A | 7/1984 | Siefert et al. |
| 5,050,656 | A | 9/1991 | Ho |
| 6,073,668 | A | 6/2000 | Iwasaki et al. |
| 6,196,289 | B1 | 3/2001 | Yoshioka |
| 6,374,887 | B1 * | 4/2002 | Subotics ........................ 152/276 |
| 6,640,859 | B1 | 11/2003 | Laurent et al. |
| 6,994,135 | B2 | 2/2006 | Delfino et al. |
| 7,104,302 | B2 * | 9/2006 | Christenbury et al. ........ 152/516 |
| 7,546,862 | B2 * | 6/2009 | Moon et al. .................... 152/276 |
| 8,091,596 | B2 * | 1/2012 | Louden ............................. 152/5 |
| 2003/0226630 | A1 | 12/2003 | Delfino et al. |
| 2005/0121127 | A1 * | 6/2005 | Kuramori et al. ............. 152/520 |
| 2006/0249236 | A1 | 11/2006 | Moon et al. |

FOREIGN PATENT DOCUMENTS

| HU | 223 293 B1 | 5/2004 |
|---|---|---|
| WO | WO 00/37269 | 6/2000 |
| WO | WO 2009/064075 | 5/2009 |

OTHER PUBLICATIONS

International Search Report and Written Opinion issued in International Application No. PCT/US2012/046061 dated Sep. 11, 2012.

* cited by examiner

*Primary Examiner* — Kip T Kotter
*Assistant Examiner* — Jean Charleston
(74) *Attorney, Agent, or Firm* — Jennifer E. Lacroix; DLA Piper LLP US

(57) ABSTRACT

A non-pneumatic tire for a vehicle is provided that has a body of elastic material and a circumferentially-extending crown portion that has a running surface and circumferentially-extending sidewalls joined to the crown portion. A number of radially-extending springs are at least partially embedded within the tire body. An internal support structure includes a circumferentially extending backbone and at least one connector component that connects the backbone to each of the springs.

16 Claims, 5 Drawing Sheets

NON-PNEUMATIC TIRE

BACKGROUND

The present technology generally relates to tires for vehicles, and more specifically to non-pneumatic tires.

Tires currently used on vehicles are generally pneumatic tires, having a toroidally shaped body made of a flexible elastomer material, such as rubber, with reinforcing materials such as fabric and wire, and being filled with compressed air to form an inflatable cushion. Pneumatic tires generally fit around a standard rim to protect it and enable better vehicle performance by providing a flexible cushion that absorbs shock. With such tires, internal air pressure is necessary to carry the load acting on the tires. Vehicle tires working with internal air pressure function well in practice, however, they do suffer from significant drawbacks. Such drawbacks include complex structural designs as well as safety issues in the event of a puncture during their use on public roads.

Airless, or non-pneumatic, tire designs exist in the prior art. However, several known non-pneumatic tire designs are unsuitable for carrying loads over approximately 450 lbs., as the crown portions of the springs of each become flat and, due to the large deformation, the springs fatigue and break. Additionally, some known non-pneumatic tire designs can only be used on vehicles with low traveling speeds, such as vehicles having a maximum speed of 25 mph to 35 mph. In cases of a larger load or faster speed, the temperature of the vehicle tires can significantly exceed the acceptable temperature limit of 175° F. to 195° F. due to large spring deformations. As a consequence, the rubber material of the tire body can age very quickly, becoming thereby unsuitable for further use. A further disadvantage of some known non-pneumatic tires is the small side stability characteristic for their high profiles. This makes their safe operation in today's high-speed vehicles impossible.

U.S. Pat. No. 1,113,036 to Mitchell describes a pneumatic tire having a series of arched and transversely extending bands or straps of metal, which are each terminally looped around the bead rings of the tire, in order to increase the puncture resistance of the tire. The arched bands extend throughout the cross sectional area of the outer case of the tire, and they are embedded in the outer case of the tire throughout their length. The side edges of the arched bands are rounded and bear against each other.

U.S. Pat. No. 1,471,580 to Walton describes a tire that has a skeleton framework formed of substantially U-shaped wire elements, each of which has its cross head bent into a channel shape. The ends of the wire elements have loops or eyes that receive cables or wires employed in securing the elements together. The skeleton frame is embedded in vulcanized fiber, which provides a channel-shaped recess around the periphery of the skeleton frame to receive a key-stone cushion of hard rubber, which is in the form of a band encircling the skeleton frame.

U.S. Pat. No. 1,610,238 to Benson discloses a tire having a series of spring elements bent in a substantially horse-shoe form, which are molded and embedded in the casing of the tire, and preferably do not protrude therefrom at any point. In the central portion of each spring, adjacent to the tread of the tire, a circular loop or eye is formed, and a rod or heavy wire extends circumferentially of the tread portion of the casing and passes through the loops of all the spring elements. At the ends of the spring elements, adjacent to the rim portion of the casing, the spring elements are formed with eyes through which wires extend that similar to conventional bead rings.

U.S. Pat. No. 6,994,135 to Delfino describes a flexible tire including a flexible load-bearing structure extending circumferentially about an axis of rotation, a tread on the radially outer periphery of the load-bearing structure, and at least one fastening zone, radially to the side of the axis of rotation, for immobilizing the load-bearing structure on a wheel disc. The tire also includes a plurality of support elements extending essentially transversely, a first part of which is arranged at least facing the tread, and another part of which is arranged beyond the tread, the support elements being juxtaposed circumferentially and distributed around the full circumference of the load-bearing structure. The load-bearing structure also comprises an interconnection structure between the support elements, preferably arranged radially between the tread and the support elements. The profile of the tire defines a toric inner cavity of ovoid section.

Commonly assigned U.S. Pat. No. 6,374,887 to Subotics discloses a tire which is of an elastic material, preferably rubber or an elastomer, and is provided with a crown portion and sidewalls adjacent to the crown portion, wherein both sidewalls terminate in beads by which the tire is mounted on a wheel rim in a pre-stressed (biased) state. The internal boundary surface of the crown portion oriented toward the wheel rim is provided with transverse troughs spaced circumferentially at specified distances from one another. Between every two adjoining troughs stiffening ribs are defined, which interconnect the crown portion, the sidewalls, and the beads. The stiffening ribs are supported by arcuately bent leaf springs, the endings of which are resiliently embedded in the beads. The leaf springs are situated along the internal boundary surface of the crown portion at specified intervals, and are positioned to connect the two beads with one another. The beads, in turn, are held in a wheel rim in a pre-stressed state.

Commonly assigned U.S. Pat. No. 7,546,862 discloses non-pneumatic tires having a body made of an elastic material. The body has a crown portion containing the running surface and two sidewalls joined to the crown portion via shoulder portions and ending in beads. Radially placed curved springs are situated so as to be circumferentially-spaced in specified distances from each other and extend from one bead to the other. The tire's beads are secured within the flange of a standard rim by tension as the beads are stretched to get over the flange of the rim during installation of the tire onto the rim. The curved springs are embedded in the tire body at least along the crown portion. The shape of the springs can be semi-elliptical, or can be a compound-curve having S-shaped sidewalls.

BRIEF SUMMARY

The present technology relates to non-pneumatic tires that include an internal support structure.

In one aspect, the present technology provides a non-pneumatic tire that includes a tire body, a plurality of radially extending springs, and an internal support structure. The tire body can have a circumferentially-extending crown portion, and first and second circumferentially-extending sidewalls, the first and second circumferentially-extending sidewalls being joined to the crown portion by first and second shoulder portions and ending in circumferentially-extending first and second beads. Additionally, each spring can be at least partially embedded in the tire body. Further, the internal support structure can include a circumferentially extending backbone and at least one connector component that connects the backbone to each of the springs.

In one example, the internal support structure can include the circumferentially extending backbone and a plurality of struts that engage the plurality of springs, wherein one strut engages each spring, and the struts are linked together by the circumferentially extending backbone ring.

In another example, the internal support structure can include the circumferentially extending backbone and at least one connector component that connects the backbone to each of the springs, wherein the connector component comprises a sinuous ring connector.

BRIEF DESCRIPTION OF SEVERAL VIEWS OF THE DRAWINGS

Specific examples have been chosen for purposes of illustration and description, and are shown in the accompanying drawings, forming a part of the specification.

DETAILED DESCRIPTION

Figure 1:
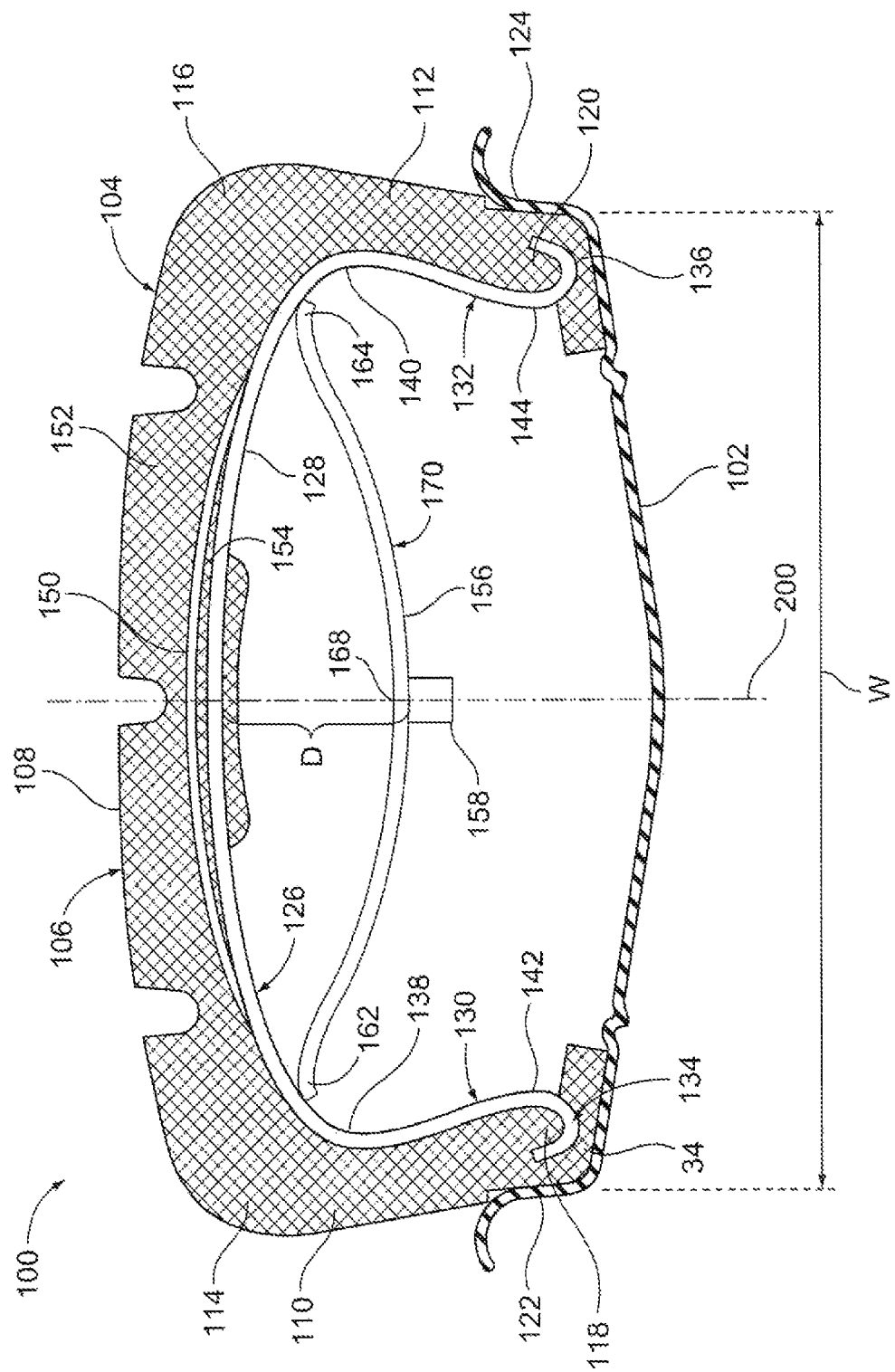
FIG. 1 is a cross-sectional view of one embodiment of a non-pneumatic tire of the present technology mounted on a wheel rim.
Figure 2:
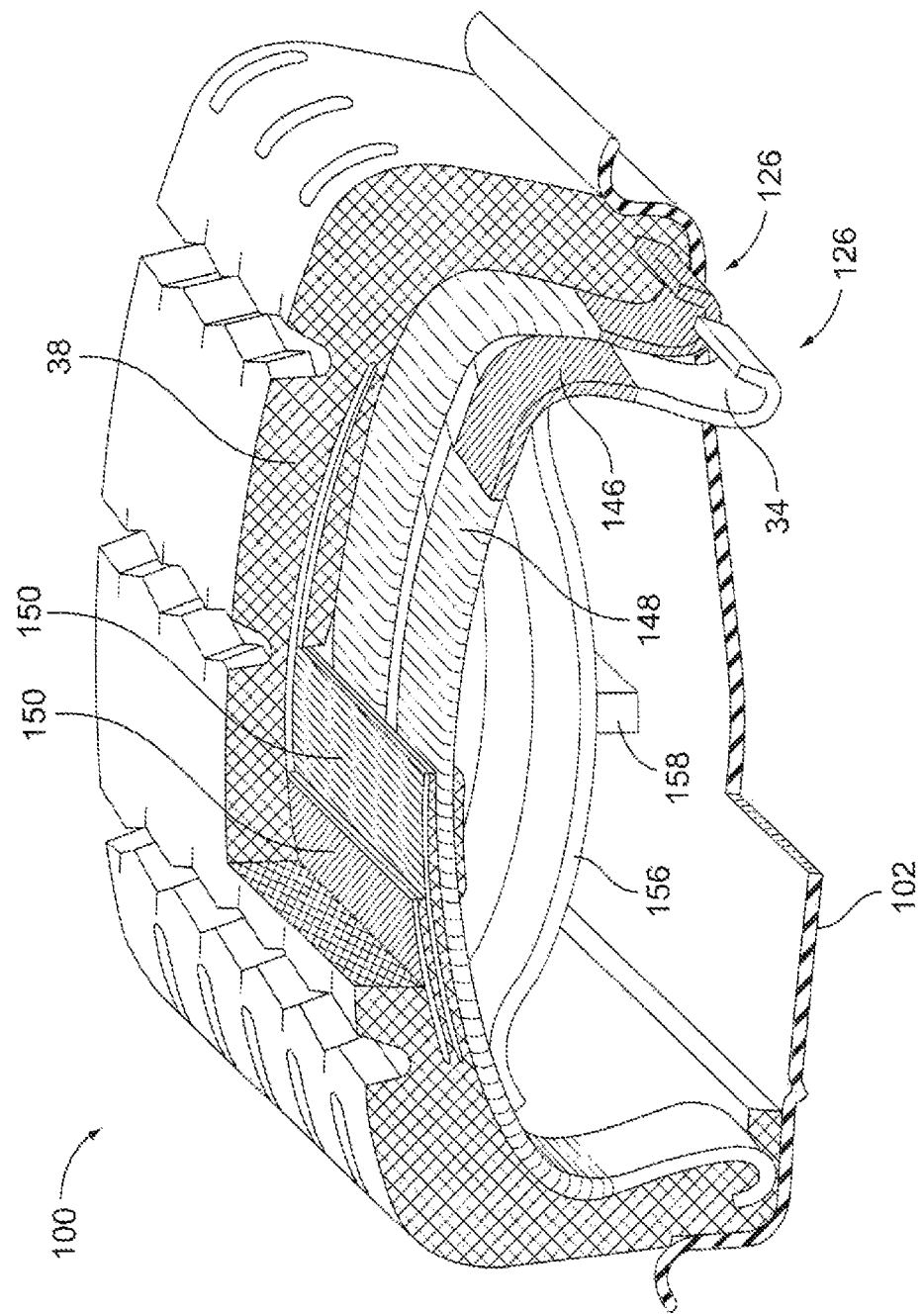
FIG. 2 is a perspective sectional view of the tire of FIG. 1.
Figure 3:
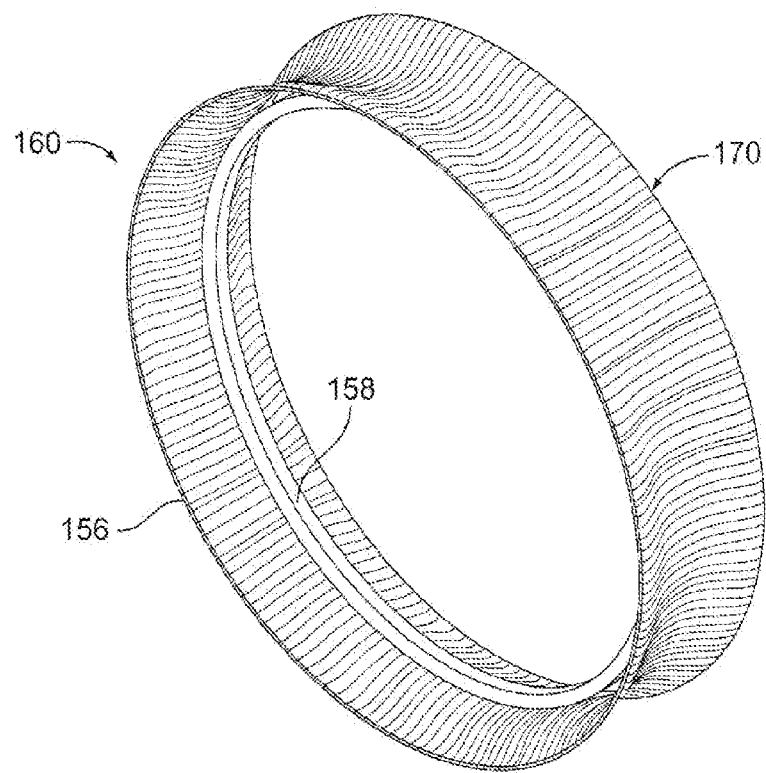
FIG. 3 is a perspective view of an internal support structure of the tire of FIG. 1.

FIGS. 1 and 2 illustrate a non-pneumatic tire 100 of the present technology seated on a standard rim 102. Non-pneumatic tire 100 includes a tire body 104, which is preferably made of an elastic material. The elastic material can be any material suitable for a tire, including elastomers such as natural rubber, synthetic rubber, and polyurethane. The body of the tire can be formed by any suitable method, such as by bladder compression molding. The tire body 104 has a circumferentially-extending crown portion 106 provided with the running surface 108, first and second circumferentially-extending sidewalls 110 and 112 that are joined to the crown portion by first and second shoulder portions 114 and 116. The first and second circumferentially-extending sidewalls 110 and 112 end in circumferentially-extending first and second beads 118 and 120, respectively.

Non-pneumatic tires of the present technology can be used on standard rims, which have an effective width and include opposing rim flanges that are separated by the effective width of the standard rim. Accordingly, as illustrated in FIGS. 1 and 2, standard rim 102 has a first rim flange 122 and a second rim flange 124 that are separated by the effective width W of the standard rim 102. The first bead 112 and the second bead 114 of the non-pneumatic tire 100 are separated by a distance that spans the effective width W of the standard rim 102, and are configured such that the first bead 112 engages the first rim flange 122 and the second bead 114 engages the second rim flange 124 when the non-pneumatic tire 100 is seated on the standard rim 102. The standard rim 102 can be a single-piece standard rim as illustrated, such as those that currently tend to be used on automobiles, or a multi-piece rim, such as those that currently tend to be used on some trucks and other heavier vehicles.

As illustrated in FIGS. 1 and 2, the body 104 of the non-pneumatic tire 100 includes a plurality of radially extending springs 126 that are each at least partially embedded in the tire body 104. Each spring 126 includes a top portion 128, first and second sidewalls 130 and 132 that are connected to the top portion 128, and first and second end portions 134 and 136 that are connected to first and second sidewalls 130 and 132, respectively. The first and second end portions 134 and 136 terminate within the first and second beads 118 and 120 of the tire body 104, respectively. The first sidewall 130 can include a first upper sidewall portion 138 that is connected to the top portion 128, and the second sidewall 132 can include a second upper sidewall portion 140 that is connected to the top portion 128. The first sidewall 130 can include a first lower sidewall portion 142 that is connected to the first upper sidewall portion 138, and the second sidewall 132 can include a second lower sidewall portion 144 that is connected to the second upper sidewall portion 140.

As illustrated in FIGS. 1 and 2, the top portion 128 of a spring 126 can be slightly convex, curving outwardly, with respect to the vehicle wheel rim 102. The first and second upper sidewall portions 138 and 140 can each be convex with respect to a vertical radial plane of the tire 100, which is indicated at 200 in FIG. 1. The first and second lower sidewall portions 142 and 144 can each be concave, curving inwardly, with respect to the radial plane 200 of the tire 100. As a result, when viewed in cross-section as illustrated in FIG. 1, the first sidewall 130 of a spring 126 can be an S-shaped sidewall, and the second sidewall 132 of a spring 126 can be an inverted S-shaped sidewall.

Figure 6:
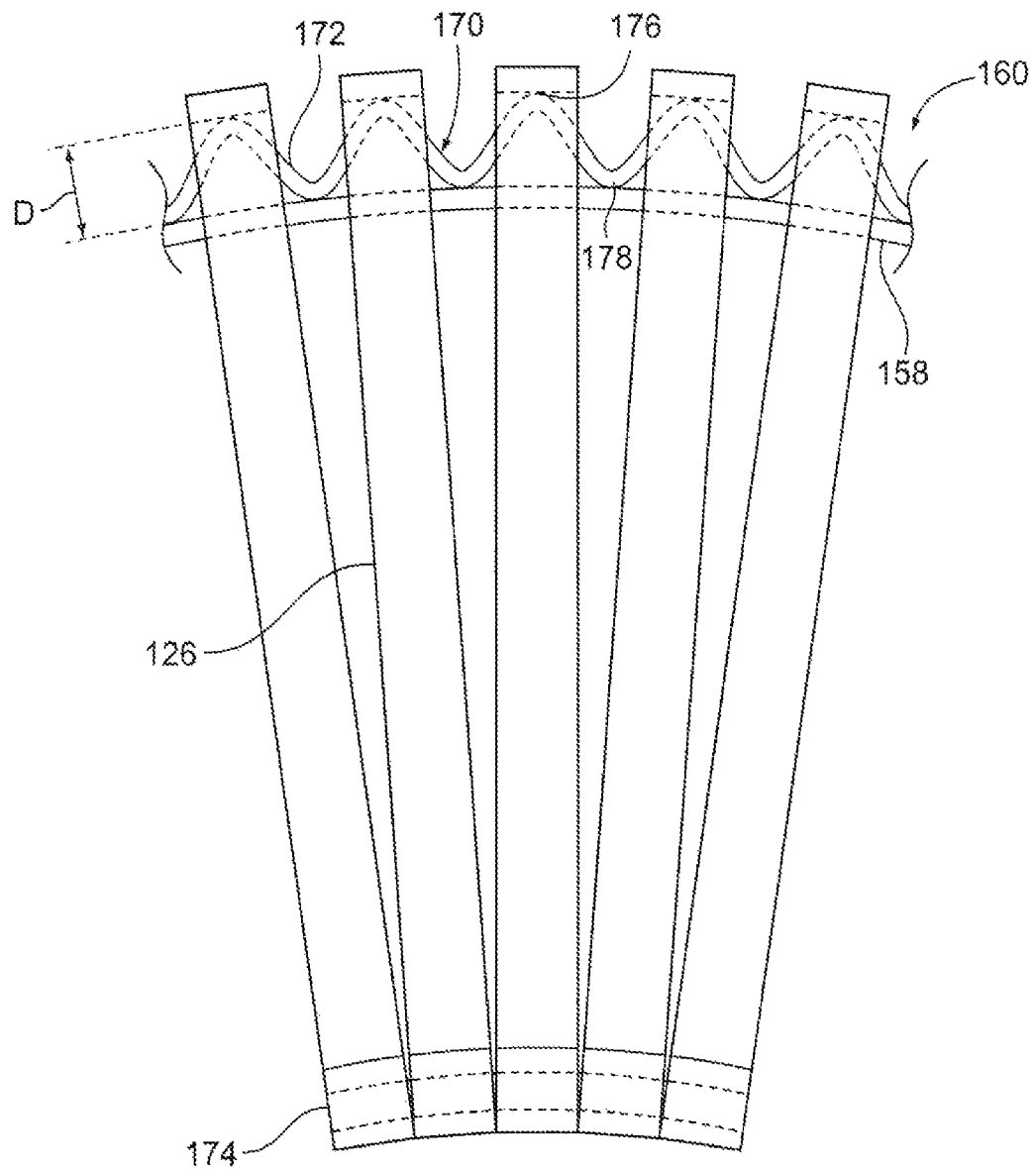
FIG. 6 is a side view of the springs and internal support structure of a second embodiment of a non-pneumatic tire of the present technology.

As illustrated in FIGS. 1, 2, and 6 the first and second end portions 134 and 136 of a spring 126 can each extend outwardly with respect to the radial plane 200 of the tire 100. In the illustrated example, the first and second ends 134 and 136 are generally semi-circular, coated with rubber. The first and second ends 134 and 136 can contain a tire bead wire package 174, and can each bear on the bead-seat area of the rim 102 to distribute the load from the tire to the standard rim.

The thickness and width of a spring 126 may be varied depending upon the application for which the tire 100 is being used. In at least one example, a spring 126 can be, for example, about 4 mm thick and about 10 mm wide.

Springs 126 can be made from any suitable material. In one example, a spring 126 can be made from a composite having a thermoplastic matrix and glass fiber reinforcement, commonly known as fiber-reinforced plastic or fiberglass. The thermoplastic matrix can be, for example, poly-ethylene terephthalate (PET), or polyester. In other examples, other thermoplastics, epoxy, vinyl ester or other thermosets may also be used as a matrix material. As an alternative to the glass fiber reinforcement, poly(p-phenylene-2,6-benzobisoxazole) fiber, a synthetic polymer material marketed under the trade name Zylon™ by Toyobo Corporation in Japan, or para-aramid fiber, such as Kevlar™ marketed by E. I. du Pont de Nemours and Company, a Delaware Corporation, may be used. In other examples, any high-strength, high-modulus fiber, such as high-density polyethylene fiber, fused quartz, boron fiber, silicon carbide fiber, or carbon fiber, may be used. As an alternative to the composite construction, compound-curve springs 126 may be made of single-layer or multi-layer spring steel.

The springs 126 can be manufactured in any suitable manner. For example, springs 126 can be manufactured by pultrusion with subsequent thermoforming. A peel ply textured film can be applied to the spring mold before thermoforming the spring. During thermoforming, the thermoplastic matrix material can flow into the voids, cracks and cavities of the peel ply to avoid a glossy surface and raise the surface roughness to promote bonding with materials later applied to the surface of the spring. Alternatively, for example, the springs can be compression-molded, injection-molded, or extruded and thermoformed.

Portions of the springs 126 can preferably be covered by the body 104 of the tire. For example, the first and second ends 142 and 144 of a spring 126 can be embedded in the first and second beads 134 and 136 of the tire body 104, respectively. Additionally, a section of the to portion 128 of a spring 126 can be embedded in the crown portion 106 of the tire body 104.

As illustrated in FIG. 2, in examples where the tire 100 is produced by compression molding, an adhesive 146 can be added to the spring surface before the molding and permits the rubber to vulcanize directly onto the surface of the spring to provide a bond strength higher than the tear strength of the rubber to avoid adhesive failure. The adhesive can be any suitable adhesive, and in some examples can be a Chemlok™ adhesive, marketed by Lord Corporation, which has its headquarters in Cary, N.C. As also illustrated in FIG. 2, the portions of the springs 126 that are below the running surface 108 of the tire body 104, including for example, the top portion 126 of the springs 126, can be covered by a strengthening material 148, such as steel belting or rubber-calendered synthetic fiber belting.

As illustrated in FIGS. 1 and 2, a pair of belt inserts 150 can be embedded into the crown portion 106 of the tire 100 above the top portion 128 of the springs 126. The upper portion 152 of the crown portion 106, located above the belts 150, can be provided with a tread pattern. Belts 150 can be constructed of a high-strength and low-stretch material. For example, the material of the belts 150 can be steel, but may alternatively be a high-strength rubber-calendered fabric. Belts 150 may also alternatively be constructed from a fabric containing para-aramid fiber or steel cords situated in an angle of minimum 10° to the circumferential axis of the crown portion 106. The lower portion 154 of the crown portion 106, located below the belts 150 and above the springs 126, can preferably have a thickness of at least 2 mm. The belts 150 can help to ensure the adhesion of the non-pneumatic tire 100 to standard rim 102 during highway-speed travel, such as speeds of from about 50 mph to about 400 mph.

Non-pneumatic tires of the present technology also include an internal support structure that includes a circumferentially extending backbone ring 158 and at least one connector component 170 that connects the backbone 156 to each of the springs 126. The backbone ring 158 extends circumferentially within the tire 100, and is thus circular, or substantially circular. The backbone ring 158 is offset a distance D from the springs 126. The backbone ring 158 can be formed in any suitable manner, and in one example can be formed from a single molded piece having a rectangular cross-section and a length that is about four (4) times the circumference of the inside of the tire into which the backbone ring 158 is to be installed. In such an example, the single molded piece can be wrapped or coiled to form a multilayer circle that forms the backbone 158.

A first example of an internal support structure of the present technology is illustrated in FIGS. 1-5. As shown in the first example, the connector component 170 includes a plurality of struts 156 that engage the plurality of springs 126. Preferably, one strut 156 engages each spring 126. The struts 156 of the non-pneumatic tire 100 are linked together by the circumferentially extending backbone ring 158. In this example, the distance D by which the backbone ring 158 is offset from the springs 126 can be any suitable distance, including for example from about 1 mm to about 10 mm.

Figure 4:
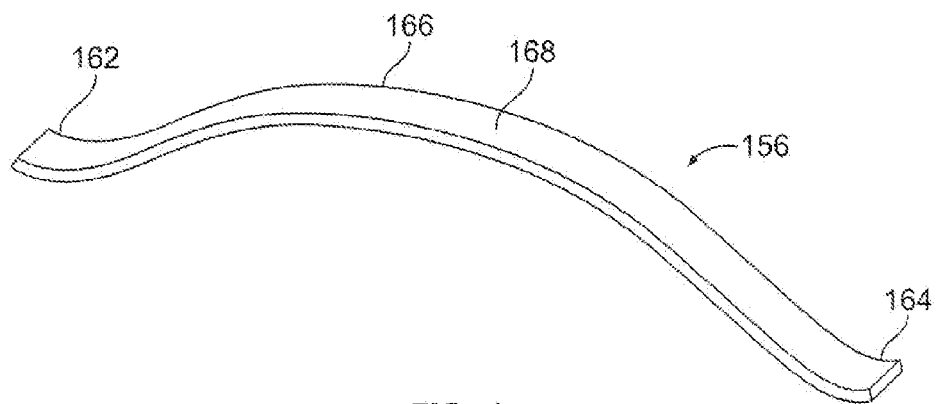
FIG. 4 is a perspective view of a strut of the tire of FIG. 1.

As illustrated in FIG. 4, each strut 156 has a first end 162, a second end 164, and a curved body 166 that extends from the first end 162 to the second end 164. The shape of each strut can be a tangent smooth curve. Each strut can have a strut centerpoint 168 midway between the first end 158 and the second end 160. The backbone 158 can be secured to each strut 156 at the strut centerpoint 168.

As illustrated in FIGS. 1 and 2, each strut 156 can be located on an internal side of each spring 126, the running surface 108 of the crown portion 106 of the tire body 104 being on an external side of the spring 126. Each strut 156 can be concave, curving radially inwardly, with respect to the standard rim 102. The first end 162 and second end 164 of a strut 156 can each engage a spring 126, and can each be bonded to the spring 126. The first end 162 of the strut 156 can be bonded to the top portion 128 of the spring 126 at or near the juncture between the top portion and the first side wall 130, and the second end 164 of the strut 156 can be bonded to the top portion 128 of the spring 126 at or near the juncture between the top portion and the second side wall 132. The backbone 158 can be bonded to each of the struts 156 at the strut center 168, and can be in alignment with the radial plane 200 of the non-pneumatic tire 100. In some examples, the struts 156 and the backbone ring 158 can be formed of the same material and by the same method as the springs.

As the tire is loaded by the weight of the vehicle, the portion of the running surface 108 that is in contact with the driving surface will tend to flatten. As force from the driving surface bears on the one or more crown portions 106 of the tire body 104 that correspond to the area of the tire in contact in the driving surface, the one or more crown portions 106 will bear on their respective struts, the struts will bear on the backbone 158, and force will be distributed throughout the tire by the internal support structure.

Figure 5:
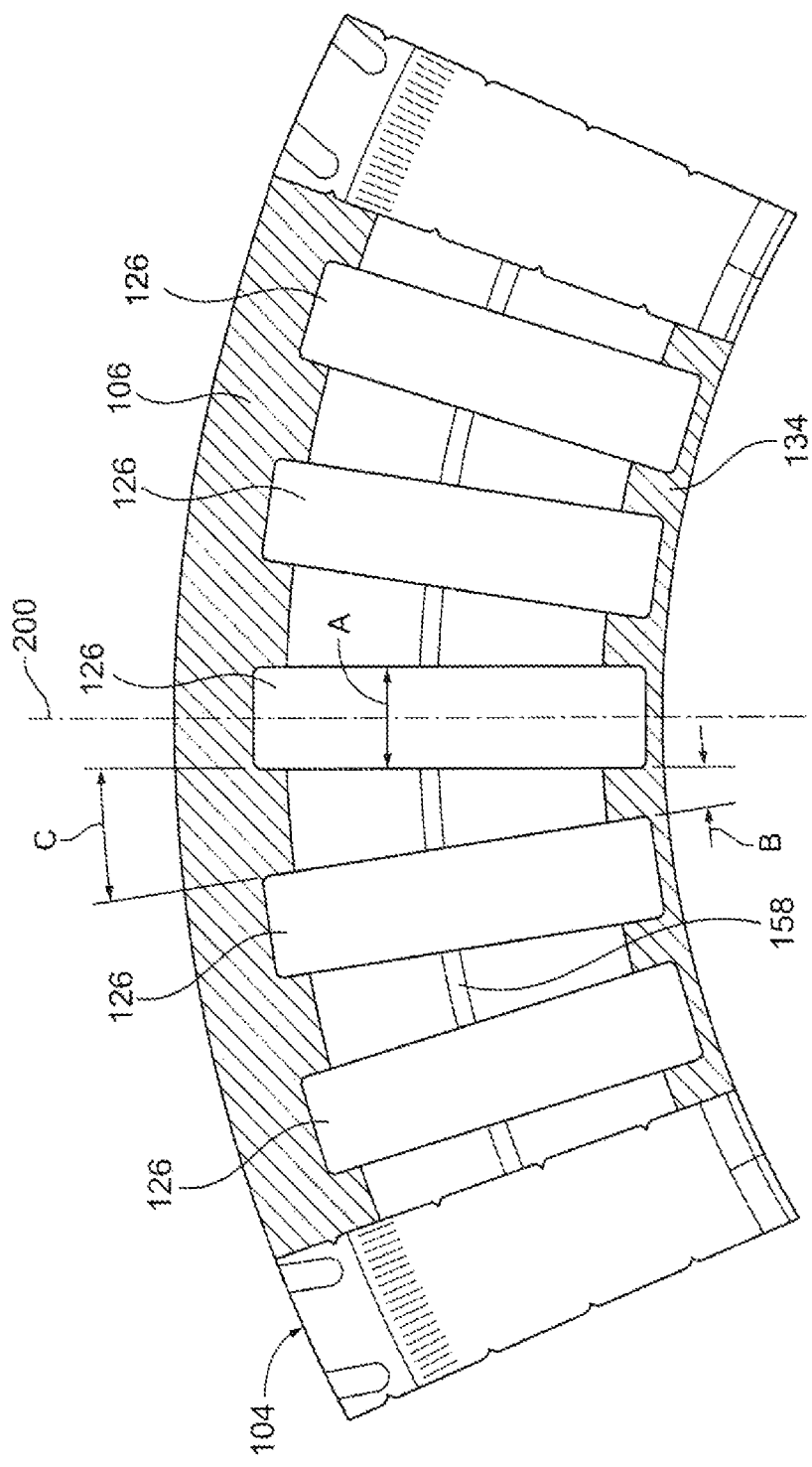
FIG. 5 is a side cut-away view of the tire of FIG. 1.

FIG. 5 illustrates an arrangement of springs 126 in a non-pneumatic tire 100. The thickness of the springs 126, the breadth A of the springs 126, the upper circumferential spacing distance C between the springs 126 as measured at the crown portion 106, and the lower circumferential spacing distance B as measured at the bead 134, may vary based upon the size of non-pneumatic tire 100, as well as on the properties the non-pneumatic tire 100 is desired to have. In some examples, considering the dynamic properties of the elastic material of the tire body, distance C and dimension A can be a minimum of about 7 mm each, and distance B will tend toward zero.

A second example of an internal support structure of the present technology is illustrated in FIG. 6. As shown in the second example, the connector component 170 includes a sinuous ring connector 172 having a plurality of peaks 176 and nadirs 178. The sinuous ring connector extends circumferentially within the tire 100, and connects each spring to the backbone ring 158. As illustrated, each peak 176 of the sinuous ring connector 172 is connected to a spring 126, preferably at a centerpoint of the spring that intersects the vertical radial plane of the tire 100 (illustrated at 200 in FIG. 1). Additionally, each nadir 178 of the sinuous ring connector 172 is connected to the backbone ring 158. In this example, the distance D by which the backbone ring 158 is offset from the springs 126 can be any suitable distance, including for example from about 1 mm to about 15 mm, and in one example can be about 13 mm (about 0.5 inches).

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:

1. A non-pneumatic tire comprising:
   a tire body having a circumferentially-extending crown portion, and first and second circumferentially-extending sidewalls, the first and second circumferentially-extending sidewalls being joined to the crown portion by first and second shoulder portions and ending in circumferentially-extending first and second beads;
   a plurality of radially extending springs, each spring being at least partially embedded in the tire body; and
   an internal support structure that includes a circumferentially extending backbone and at least one connector component that connects the backbone to each of the springs, the circumferentially extending backbone being offset a distance radially inwardly from the springs.

2. The non-pneumatic tire of claim 1, wherein each spring comprises a top portion, first and second sidewalls that are connected to the top portion, and first and second end portions that are connected to first and second sidewalls and terminate within the first and second beads of the tire body.

3. The non-pneumatic tire of claim 2, wherein:
   the first sidewall comprises a first upper sidewall portion that is connected to the top portion and a first lower sidewall portion that is connected to the first upper sidewall portion; and
   the second sidewall comprises a second upper sidewall portion that is connected to the top portion, and a second lower sidewall portion that is connected to the second upper sidewall portion.

4. The non-pneumatic tire of claim 3, wherein:
   the first and second upper sidewall portions are each be convex with respect to a vertical radial plane of the tire; and
   the first and second lower sidewall portions are each concave with respect to the vertical radial plane.

5. The non-pneumatic tire of claim 1, wherein the connector component comprises a sinuous ring connector.

6. The non-pneumatic tire of claim 5, the sinuous ring connector comprising a plurality of peaks and a plurality of nadirs, wherein each peak of the sinuous ring connector is connected to a spring, and each nadir of the sinuous ring connector is connected to the backbone ring.

7. The non-pneumatic tire of claim 1, wherein the connector component comprises a plurality of struts that engage the plurality of springs, wherein one strut engages each spring.

8. The non-pneumatic tire of claim 7, wherein each strut comprises has a first end, a second end, and a curved body that extends from the first end to the second end.

9. The non-pneumatic tire of claim 7, wherein each strut has a strut center midway between the first end and the second end, and the backbone ring is secured to each strut at the strut center.

10. The non-pneumatic tire of claim 7, wherein the first and second ends of each strut engage a spring, and the body of the strut curves radially inwardly with respect to the tire.

11. A non-pneumatic tire comprising:
    a tire body having a circumferentially-extending crown portion, and first and second circumferentially-extending sidewalls, the first and second circumferentially-extending sidewalls being joined to the crown portion by first and second shoulder portions and ending in circumferentially-extending first and second beads;
    a plurality of radially extending springs, each spring being at least partially embedded in the tire body; and
    an internal support structure that includes a circumferentially extending backbone and a plurality of struts that engage the plurality of springs, wherein the circumferentially extending backbone is offset a distance radially inwardly from the springs, one strut engages each spring, and the struts are linked together by the circumferentially extending backbone ring.

12. The non-pneumatic tire of claim 11, wherein each strut comprises has a first end, a second end, and a curved body that extends from the first end to the second end.

13. The non-pneumatic tire of claim 11, wherein each strut has a strut center midway between the first end and the second end, and the backbone ring is secured to each strut at the strut center.

14. The non-pneumatic tire of claim 11, wherein the first and second ends of each strut engage a spring, and the body of the strut curves radially inwardly with respect to the tire.

15. A non-pneumatic tire comprising:
    a tire body having a circumferentially-extending crown portion, and first and second circumferentially-extending sidewalls, the first and second circumferentially-extending sidewalls being joined to the crown portion by first and second shoulder portions and ending in circumferentially-extending first and second beads;
    a plurality of radially extending springs, each spring being at least partially embedded in the tire body; and
    an internal support structure that includes a circumferentially extending backbone and at least one connector component that connects the backbone to each of the springs, wherein the connector component comprises a sinuous ring connector.

16. The non-pneumatic tire of claim 15, the sinuous ring connector comprising a plurality of peaks and a plurality of nadirs, wherein each peak of the sinuous ring connector is connected to a spring, and each nadir of the sinuous ring connector is connected to the backbone ring.

* * * * *